March 9, 1937. M. U. CAILLAU 2,073,294
HOSE CLAMP
Filed March 1, 1935 3 Sheets-Sheet 1
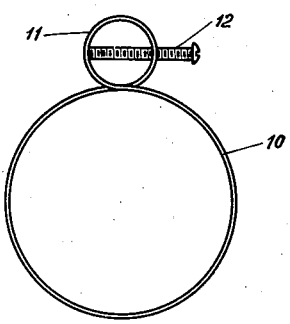
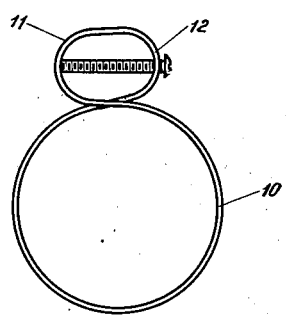
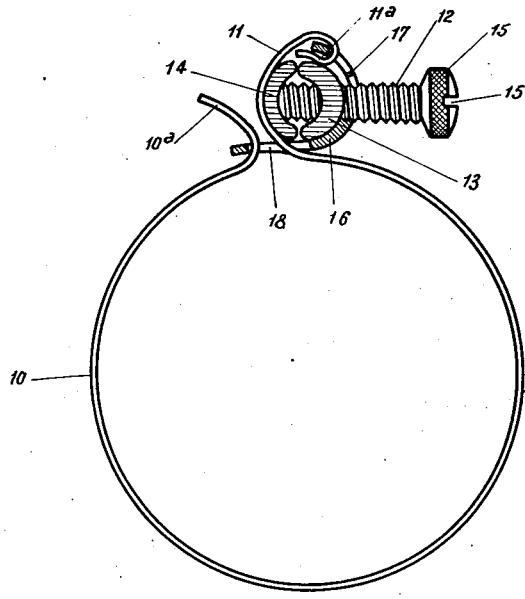
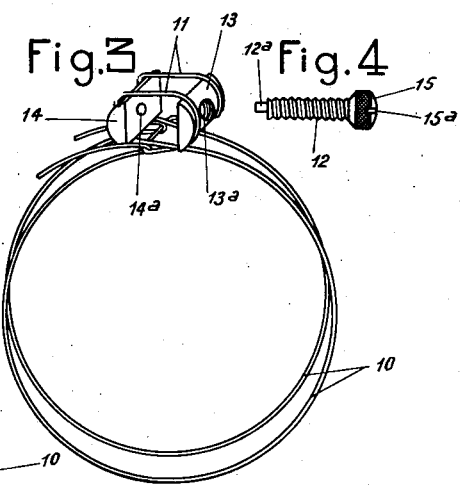
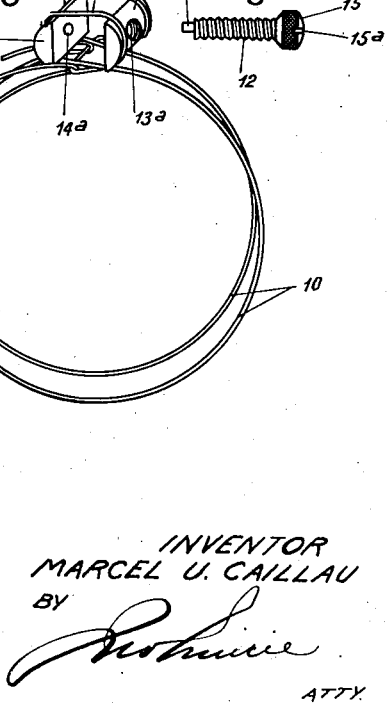
INVENTOR
MARCEL U. CAILLAU
BY
ATTY.

March 9, 1937.                M. U. CAILLAU                2,073,294
                                HOSE CLAMP
                            Filed March 1, 1935            3 Sheets-Sheet 2
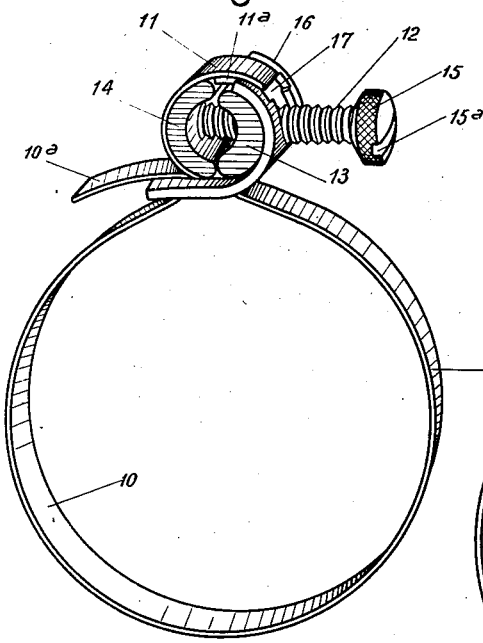
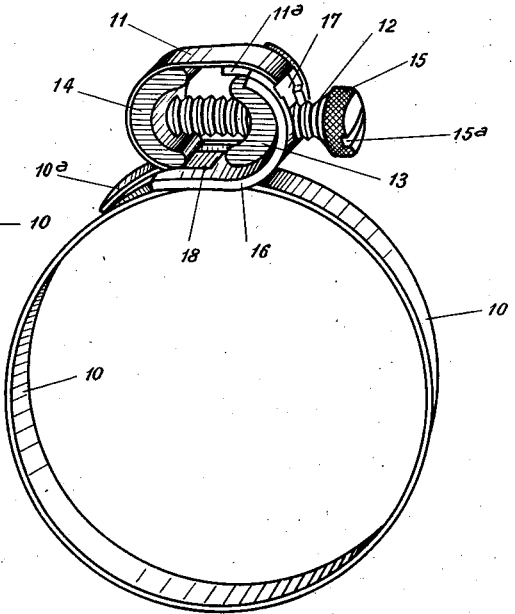
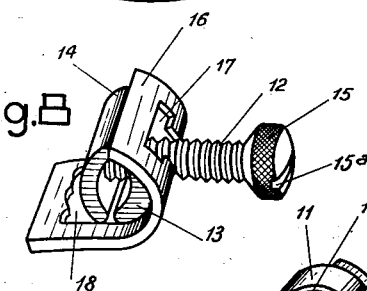
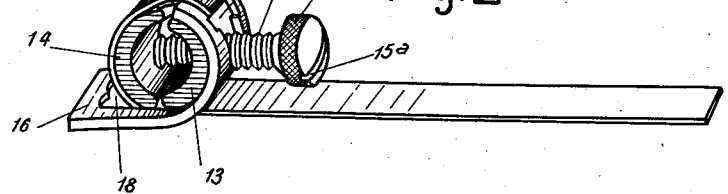
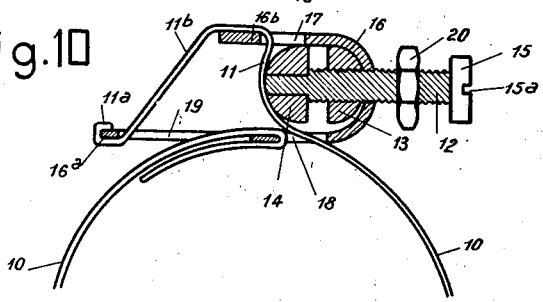
INVENTOR
MARCEL U. CAILLAU
BY
ATTY.

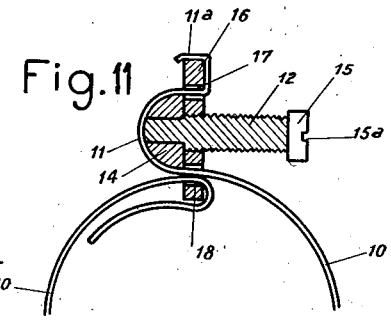
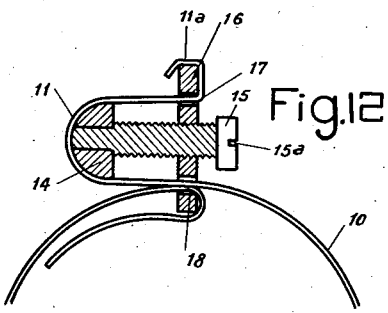
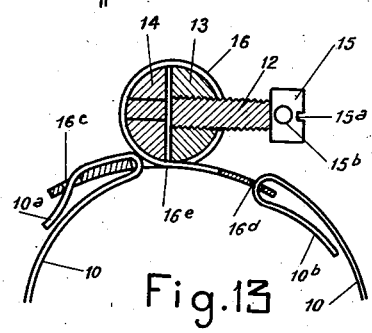
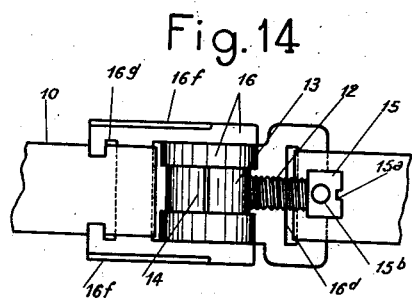
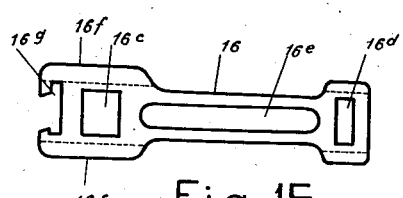
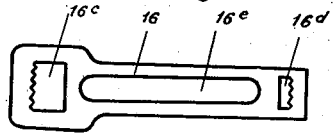
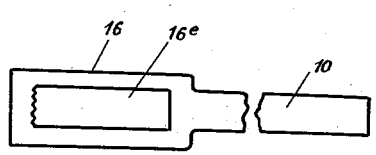
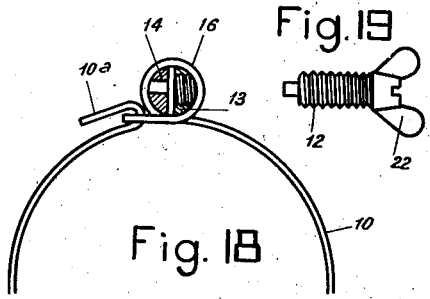

Patented Mar. 9, 1937

2,073,294

UNITED STATES PATENT OFFICE 2,073,294

HOSE CLAMP

Marcel Urbain Caillau, Boulogne-sur-Seine, France

Application March 1, 1935, Serial No. 8,956
In Great Britain January 17, 1935

9 Claims. (Cl. 24—19)

This invention relates to hose clamps and has more particular reference to the type of hose clamps comprising a flexible tie such as a band or strip curved to form a loop around a hose or similar object to be clamped, and a screw engaging through suitable portions of said band or strip and capable of decreasing or increasing the cross sectional area of said loop for clamping the hose inside the loop or for releasing said hose.

There are several kinds of this known type of hose clamps comprising a flexible band or strip curved to form a loop around a hose or similar object and having its ends bent out to form a pair of lugs which are perforated to receive a screw by means of which the loop can be contracted or expanded at will. Such known hose clamps have the disadvantage of requiring a lengthy and very strong screw to permit the band to be tightened or released to the required extent while avoiding the screw becoming distorted or torn off under the high pressures to which the band is subjected when tightened around the hose. Moreover, as the band of such known hose clamps necessarily has perforated lugs, as aforesaid, for receiving the screw, said lugs frequently break off in use, which is another serious disadvantage, particularly when the clamp is fitted on a hose forming a coupling for rigid pipes through which a fluid flows, for instance in the case of such rubber hoses as are used to connect the cooling water jackets of internal combustion engines to honeycomb radiators of automobiles.

The primary object of the invention is to provide a hose clamp of the type comprising a screw or more generally a screw-threaded rod or spindle but of such an improved construction as to obviate the above-stated disadvantages owing to a novel shape and a novel structure of the clamping band or more generally of the flexible tie which is adapted to surround the object to be clamped, said novel shape and structure permitting to use a shorter and more slender screw than in hose clamps constructed heretofore while allowing of quicker and safer tightening and releasing actions.

Another object of the invention is to provide a hose clamp of the type comprising a screw for actuation purposes but capable of utilizing, as a flexible tie, either a band or strip made for instance of curlable sheet of metal or foil or a wire.

Still another object of the invention is to provide a hose clamp of the aforesaid type wherein a relatively small stress imparted to the screw permits the cross sectional area of the tie loop encompassing the hose or similar article to be quickly and considerably decreased or increased for clamping or releasing said article.

A still further object of the invention is to provide a hose clamp of the aforesaid type wherein the actuation of the screw in the one or the other direction is converted immediately into an increase or a decrease of the cross sectional area of the loop surrounding the hose, so that clamping or releasing thereof can be performed very quickly.

Still a further object of the invention is to provide a hose clamp of the aforesaid type, wherein although said screw may be much more slender than in known hose clamps of the same type it is not liable to break off or become distorted, this result being due to the fact that said screw has no overhanging portion and is never subjected to shearing stresses.

Still another object of the invention is to provide a hose clamp of the aforesaid type, wherein the band or strip (assuming the flexible tie being so constituted) does not require to be perforated as in known hose clamps, this result being due to the fact that the screw does not pass through holes in the band but exerts its tightening or releasing stress through the intermediary of spreading means arranged in a novel way, due to a novel shape of the band.

A still further object of the invention is to provide a hose clamp of the aforesaid type, wherein the hose does not run the risk of becoming pinched or damaged by the edges of holes of the band since no such holes require to be formed in the same.

A still further object of the invention is to provide a hose clamp of the aforesaid type, wherein the stress exerted by the screw either for tightening or for releasing the band around the hose is multiplied or magnified due to a novel construction given to said hose clamp, the space where the screw stress acts in one direction or the other being clear of the portion of the band or other flexible tie which surrounds the hose, so that the actuation of the screw is very easy and handy.

A further object still of the invention is to provide a hose clamp of the aforesaid type, wherein the screw is permitted to assume a position of equilibrium with respect to the portion of the band or flexible tie on which it acts, whereby said portion is subjected to the same tensile strength throughout its length and does not run the risk of being torn off.

Still a further object of the invention is to provide a hose clamp of the aforesaid type, wherein the stress of the screw is transmitted to the tie through the intermediary of spreading means located in a supplementary loop formed by said tie which defines an 8-shaped structure, the arrangement of said spreading means being such as to lock the ends of the tie in position to avoid undue disengagement of the clamp from the hose while in use.

Another object still of the invention is to provide an improved hose clamp formed of a minimum number of simple and rugged parts that can be made, for instance by ordinary metal stamping operations, and assembled quickly and cheaply with a very limited amount of unskilled labor.

With these and such other objects in view as will incidentally appear hereafter, the invention comprises the novel construction and arrangements of parts that will now be described in detail with reference to Figure 1 to 19 of the accompanying diagrammatic drawings which form a part of the present disclosure.

In the drawings:—

Figure 1 shows the 8-shaped structure of the improved hose clamp according to the invention, assuming said hose clamp to be in inoperative position.

Figure 2 is a view similar to Figure 1 but showing the hose clamp in operative position that is to say after the screw has been actuated in the proper direction for increasing the size of the smaller loop and decreasing the size of the companion (larger) loop.

Figure 3 is a view showing a first embodiment of the improved hose clamp, the tie being constituted by a wire bent twice upon itself to form the two strands or convolutions of the two associated loops, the adjusting screw being removed.

Figure 4 shows the screw having a knurled head which can be used in connection with the wire hose clamp shown in Fig. 3.

Figure 5 shows an elevation, partly in section, of another embodiment of the improved hose clamp, the tie being constituted by a non-perforated thin band or strip of sheet metal, a portion of the periphery of the smaller loop comprising a slotted shackle, said smaller loop containing means engaged by the screw and co-operating to permit expansion or contraction of said loop incidental to the actuation of the screw.

Figure 6 is a perspective view substantially corresponding to Fig. 5.

Figure 7 is a view similar to Fig. 6 but showing the smaller loop increased in size due to the expanded position of the spreading means.

Figure 8 is a perspective view showing the slotted shackle comprised in the hose clamp shown in Figs. 5 to 7 inclusive.

Figure 9 is a view similar to Fig. 8 showing the engagement of the flexible tie or band through the slots of the shackle shown in Fig. 8.

Figure 10 shows in broken elevation and partly in section another embodiment of the improved hose clamp, the slotted U-shaped shackle permitting the band to be fastened by countercranking one of its ends and hooking it into an end slot of the shackle which has unequal legs.

Figure 11 is an edge view, partly in section, showing a modified form of the hose clamp, the shackle being straight and formed with a pair of slots and with a tapped hole for the engagement of the screw, this view showing the clamp in released or inoperative condition.

Figure 12 is an edge view partly in section, similar to Fig. 11, assuming the spreading block to be expanded to operative position.

Figure 13 is an edge view, partly in section, showing another modified form of the hose clamp wherein the smaller loop comprises a flexible shackle accommodating a screw-holding block and a spreading block, said flexible shackle having end slots through which the ends of the band are hooked.

Figure 14 is a top plan view corresponding to Fig. 13.

Figure 15 is a plan view of the flexible slotted plate which may be curled to form the shackle shown in Figs. 13 and 14.

Figure 16 is a view similar to Fig. 15 showing a modified form of the flexible slotted plate adapted to be curled into a flexible shackle, as shown in Figs. 13 and 14.

Figure 17 is a plan view showing a slotted flexible plate capable of being curled into the form of a flexible shackle, said plate being formed integral with one end of the band.

Figure 18 is an edge view of the flexible shackle obtained by curling upon itself the slotted plate shown in Fig. 17, the band formed integral with said shackle being shown fragmentarily.

Figure 19 shows a wing screw utilizable in connection with the form of hose clamp shown in Fig. 18.

For convenience of illustration, the several figures were drawn at different and arbitrary scales but, for the sake of clearness, like references designate like parts throughout all the figures.

The improved hose clamp, as will be understood from an examination of Figures 1 and 2, instead of comprising a single loop as heretofore, the new hose clamp comprises two adjacent co-operating loops 7, 8 which, by their mutual disposition, define an 8-shaped structure, the total length of the operative portions of both loops being invariable while the clamp is in use, as will be described hereafter. Advantageously one of the loops designated by 10 is larger than the other loop designated by 11. The loop 10 may be called the "clamping loop" because it actually clamps the hose (not shown) which is encompassed or girdled thereby whereas the loop 11 may be called the "controlling loop" because it acts to control the cross sectional area of the companion loop 10, under the action of the screw 12.

An important feature of the improved hose clamp is that each loop can only be rendered longer by rendering the companion loop correspondingly shorter and, conversely, can be rendered shorter only by rendering the companion loop longer. To that effect spreading means are arranged in the controlling loop. Said spreading means may take various forms, as will be described hereafter. The actuation of said spreading means is performed preferably by means of a screw 12. Such a screw may be much shorter and more slender (cheaper) than in known hose clamps because the motion of the screw 12 is multiplied by the fact that it increases the contour of the controlling loop 11 which in turn decreases the contour of the clamping loop 10. Moreover, said screw 12 is constantly supported through the loop 11; it has no overhanging portion and therefore is subjected to much smaller stresses than in former hose clamps.

In the embodiment of the improved hose clamp which is shown in Figures 3 and 4, the flexible tie which is adapted to encircle the hose or similar article (not shown) is constituted by an inextensible wire made of any suitable metal or alloy. The wire is curved to form two adjacent loops 10, 11, each formed of two convolutions, the ends of said wire being bent to define an end of the larger loop 10 while forming a hook through which an end of the smaller loop 11 is fastened, whereby the total length of the two loops 10, 11 is invariable. Said loops define an 8-shaped structure the profile of which is variable since the size of the loop 11 can be increased for decreasing the size of the loop 10 or vice versa. Inside the smaller loop 11 are freely located spreading blocks 13, 14 which may have the shape of cylindrical segments, as shown. The block 13 has a tapped hole 13a through which can be threaded the screw 12; the block 14 has a smooth hole 14a of smaller section into which is received the reduced end 12a of the screw 12 the shank of which is thus abutted against the periphery of said hole 14a. In the embodiment shown, the screw 12 has a knurled head 15 provided with a groove 15a into which may be inserted the bit of a screw-driver (not shown) for actuation purposes.

It will be appreciated that by rotating the screw 12 in the proper direction, the spreading blocks 13 and 14 can be easily moved away from each other. This increases the size of the loop 11 while correspondingly decreasing the size of the loop 10 and while therefore clamping the hose (not shown) in the last-named loop. Conversely, by rotating the screw 12 in the opposite direction, the loop 10 which encircles the hose is permitted to increase in size due to the expanding pressure exerted by the hose owing to the possibility of a decrease in size of the loop 11.

Reference being now had to Figures 5, 6, 7, 8, and 9 in which is shown another embodiment of the improved hose clamp, it will be seen that a portion of the smaller loop 11 is constituted by a shackle 16 of curved outline, fastened to the ends of the band. The shackle 16 is formed, adjacent its respective ends with slots or openings 17, 18. Into the slot 17 which is T-shaped is hooked the inwardly bent end 11a of the smaller loop 11. The slot 18 is wide enough to permit the junction or crotch portion of the loops to freely pass therethrough; in said slot 18 is hooked the outwardly bent end 10a of the larger loop 10.

Inside the smaller loop 11 (see Figures 5, 6, and 7 are freely located rigid blocks 13, 14, which, in the embodiment shown, have a curved outline which matches the inner contour of said loop. The block 14 has a smooth hole 14a in which is received the reduced end 12a of the screw 12 which is threaded through a tapped hole formed in the block 13 as in Figure 3. The shank of the screw 12 freely passes through the T-shaped slot 17 of the shackle 16 and assumes in said slot a position corresponding to the dynamic equilibrium of the blocks 13, 14 in the smaller loop comprising the parts 11 and 16. By "dynamic equilibrium" is meant here a balanced condition for which the spreading block 14 is subjected throughout its external (spreading) surface to a uniform tensile stress by the part 11 of the band. The inwardly bent end 11a of said part 11 is conveniently wedged between the latter and the external surface of the block 14, so that it cannot become unduly disengaged.

The operation of the hose clamp as described with reference to Figs. 5 to 9 inclusive is as follows:—By rotating the screw 12 in the proper direction either manually (owing to its knurled head 15) or by means of a screw driver (owing to the groove 15a) it will be seen that, as said screw 12 is engaged with the tapped hole formed in the block 13 which behaves like a nut, the block 14 is moved away from the block 13. As a result of this, the part 11 of the band is expanded while the crotch region of the loops is pulled through the slot 18 and while accordingly the cross sectional size of the larger loop 10 is correspondingly lessened. This clamps the hose (not shown) or other article girdled by said loop 10. The clamping stress is proportional to the extent of rotation of the screw 12. Owing to the engagement of the screw with the tapped hole of the block 13, the screw cannot unscrew itself, so that when the rotation thereof for clamping purposes ceases, the hose remains firmly clamped, no matter whether it undergoes releasing stresses such as vibrations, for example if the hose connects the respective stub pipes of an automobile engine and radiator. When it is desired to release the hose or other article from the clamping stress exerted thereon by the larger loop 10, all that is necessary is to rotate the screw 12 in the reverse direction. The block 14 is then allowed to move towards the block 13 which permits the smaller loop to decrease in size and the larger loop 10 to correspondingly increase in size.

By examining Fig. 7, it will be seen that, when the block 14 has been moved away from the block 13 due to the rotation of the screw 12 in the "clamping direction", the outwardly bent end 10a of the part 10 of the band is wedged between the adjacent edge of the shackle 16 and the part 11 of the band. This wedging effect prevents any undue disengagement of the band and ensures, in conjunction with the wedging of the inwardly bent end 11a of the part 11 of the band, that the total length of both loops is invariable. At the same time, owing to the freedom of the crotch region of the loops through the slot 18 of the shackle, the profile of the 8-shaped structure defined by the two adjacent loops is variable responsive to the actuation imparted thereto, by means of the screw 12, as above described.

Reference being now had to Figure 10 in which is shown diagrammatically a further embodiment of the improved hose clamp, it will be seen that the shackle 16 is shaped in a manner somewhat different from the shackle shown in Figs. 5 to 9. The shackle in Figure 10 is substantially U-shaped but has unequal legs; it also has spaced slots 17, 18 but it is provided, moreover, with a larger slot 19 formed in its longer leg for the free engagement of an extension 11b of the part 11 of the band. The end 11a of said extension is outwardly bent over the end 16a of the shackle. The part 11 of the band is bent outwardly over the other end 16b of the shackle beyond its engagement through the slot 17. This countercranking of the part 11 of the band prevents any undue disengagement of the same. Just as in the previously described embodiment, the shank of the screw 12 is engaged through a tapped hole of the block 13 and has its reduced end engaged into a smooth hole in the block 14. A locking nut 20 may be provided on the shank of the screw 12, as represented.

According to the embodiment shown in Figs. 11 and 12, the shackle 16 itself has a tapped hole to permit the shank of the screw 12 to be threaded into it. The shackle is formed with slots 17, 18, as in the previously described embodiments, for analogous purposes. The end of the shank of the screw 12 is reduced and engaged into a smooth hole formed centrally of the spreading block 14 which is in the shape of a cylindrical segment. The operation takes place substantially as above described.

According to the constructional modifications shown in Figs. 13 and 14, the shackle 16 is formed by curling upon itself a flexible plate to constitute the extensible and contractible smaller loop. The band is used only for constituting the larger loop. The ends 10a and 10b of the band are hooked into slots 16c and 16d formed in the plate from which the expansible and contractible shackle is made. The shackle also has a middle slot 16e through which the screw 12 passes. Inside the smaller loop constituted by the shackle 16 are located blocks 13, 14 which operate substantially as described with reference to Fig. 3. The head 15 of the screw 12 is shown in this instance of polygonal outline and has a hole 15b through which a spindle, nail or pointed tool can be inserted for rotating the screw in the one or the other direction more easily.

As illustrated in Figs. 15 and 16, the slot 16e of the expansible and contractible shackle 16 is large enough to permit the same to be curled upon itself to form crossed legs. The side edges of the shackle 16 may be reinforced by ribs 16f. Teeth may be formed on one edge of the slots 16c, 16d (as shown in Fig. 16) to provide a better grip on the band. The end of the shackle 16 may have side notches 16g to hold down the bent end 10a of the band and prevent it from buckling up.

According to the constructional form shown in Figs. 17, 18, and 19, the shackle 16 which is expansible and contractible as in the previously described embodiment has a central elongated slot 16e and is formed integral with an end of the band. The free end 10a of said band is bent and hooked into the slot 16e which has teeth on one of its edges to provide a safer grip on the band. The smaller or "controlling" loop formed solely by the shackle 16 contains blocks 13, 14 formed as described with reference to Fig. 13. In this constructional form, the head of the screw 12 has wings 22 to facilitate its manual actuation. The operation is substantially as described with reference to the other figures.

It is, of course, to be understood that while the forms shown in Figures 1, 2, and 3 show the tie band as an uninterrupted strip of metal while the forms shown in Figures 5, 6, 7, 8, and 9 show the band as made up of a strip of metal supplemented by a rigid shackle, yet nevertheless the tie band as a whole is, so far as the use of two loops and the formation of the band in 8-form is concerned, identical in both forms of the device. Thus, it will be understood that the term "tie band" or "band" as used in the specification and claims is intended to mean either the inner uninterrupted strip of metal for forming both loops or a strip of metal supplemented by a rigid shackle to form the second loop. The rigid shackle is, when the band is in use, a definite distinct part of the strip of metal constituting the larger loop, so that the use of the term "tie band" or "band" in the specification and claims is intended to mean any uninterrupted formation, whether continuous or not, which in use is of 8-shape with the two loops.

It will be appreciated that numerous constructional details might be changed without departing from the constructional and operative principles of the improved hose clamp as above described, the several embodiments described being only illustrative and not limitative of the constructional possibilities. All the variations in question are comprehended in the scope of the subjoined claims.

What is claimed is:

1. A hose clamp comprising a tie arranged to form two adjacent loops constituting an 8-shaped structure of variable profile adjusting means of an outline matching the inner contour of one of the loops for increasing or decreasing at will the size of said loop and for correspondingly decreasing or increasing the size of the companion loop, and means for holding the adjusting means in the selected position.

2. A hose clamp comprising a band arranged to form two adjacent loops constituting an 8-shaped structure of variable profile adjusting means located in one of the loops for increasing or decreasing at will the size of said loop and for correspondingly decreasing or increasing the size of the companion loop, and screw-threaded means engaging the adjusting means for actuating and holding them in the selected position.

3. A hose clamp comprising a band arranged to form two adjacent loops constituting an 8-shaped structure of variable profile and bent and fastened at its ends, adjusting means located in one of the loops for increasing or decreasing at will the size of said loop and for correspondingly decreasing or increasing the size of the companion loop, and a screw engaging the adjusting means for actuating them and holding them in the selected position.

4. A hose clamp comprising a band bent to form two adjacent loops, a shackle fastened to the ends of the band and completing one of the loops to form an 8-shaped structure of variable profile, said shackle having an opening through which the junction of both loops can freely pass, adjusting means located in the first-named loop for increasing or decreasing at will the size of said loop and correspondingly decreasing or increasing the size of the companion loop, and means for holding the adjusting means in the selected position.

5. A hose clamp comprising a flexible band bent to form two adjacent loops, a slotted shackle fastened to the ends of the band and so completing one of the loops as to form an 8-shaped structure of variable profile, said shackle having an opening through which the crotch portion of the band can freely slide, adjusting blocks located in the first-named loop for increasing or decreasing the size of said loop while correspondingly decreasing or increasing the size of the companion loop, and a screw passing through the shackle slot and engaging the blocks for actuating them and holding them in the selected position.

6. A hose clamp comprising a band curved to form two adjacent loops of unequal size, a slotted rigid shackle fastened to the ends of the band and so completing the smaller loop as to form an 8-shaped structure of variable profile, said shackle having an opening through which the crotch portion of the band can freely slide, adjusting blocks located in the smaller loop, and a screw passing through the shackle slot and engaging the blocks for actuating them at will and holding them in the selected position, the actuation of said blocks increasing or decreasing the size of the smaller loop while decreasing or increasing the size of the larger loop.

7. A hose clamp comprising a band bent to form two adjacent loops of unequal size, a shackle having a T-shaped slot and so fastened to the ends of the tie band as to complete the smaller loop and form an 8-shaped structure of variable profile, said shackle having an opening through which the crotch portion of the band can freely slide, adjusting blocks freely located in the smaller loop, and a screw freely passing through the T-shaped slot of the shackle and engaging the blocks or actuating them at will and holding them in the selected position, the actuation of said blocks increasing or decreasing the size of the smaller loop while correspondingly decreasing or increasing the size of the larger loop.

8. A hose clamp comprising a flexible band bent to form two adjacent loops of unequal size, a bent shackle having a pair of slots one of which is T-shaped, the ends of the band being hooked into the shackle slots so that the shackle completes the smaller loop to form an 8-shaped structure of variable profile, the shackle slot nearest to the crotch of the loops being wide enough to slidably receive the crotch region of the band, adjusting blocks freely located in the smaller loop, and a screw freely passing through the T-shaped slot of the shackle and engaging the blocks for actuating them at will and holding them in the selected position, the actuation of said blocks increasing or decreasing the size of the smaller loop while correspondingly decreasing or increasing the size of the larger loop.

9. A hose clamp comprising a flexible band bent to form two adjacent loops of unequal size, a curved rigid shackle having a pair of slots, one at least of which is serrated on its outer edge, one of said slots having a keyhole shape, the ends of the band being hooked into the shackle slots so that the shackle completes the smaller loop and forms an 8-shaped structure of variable profile, the slot adjacent the crotch of the loops being wide enough to slidably receive the crotch region of the band, a pair of curved spreading blocks freely located in the smaller loop, one of said blocks having a tapped hole and a screw freely passing through the shackle keyhole slot and engaging the tapped block, the tip of the screw having bearing engagement with the other block which forms an abutment for the screw, the actuation of the screw moving the blocks towards or away from each other for decreasing or increasing the size of the smaller loop while correspondingly increasing or decreasing the size of the larger loop.

MARCEL URBAIN CAILLAU.